(12) United States Patent
Xiao et al.

(10) Patent No.: US 7,943,083 B2
(45) Date of Patent: May 17, 2011

(54) DRUM APPARATUS FOR TREATING SLAG

(75) Inventors: Yongli Xiao, Shanghai (CN); Hua Chen, Shanghai (CN); Yin Liu, Shanghai (CN); Yongqian Li, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 342 days.

(21) Appl. No.: 11/661,643

(22) PCT Filed: Aug. 31, 2005

(86) PCT No.: PCT/CN2005/001374
§ 371 (c)(1),
(2), (4) Date: Jan. 23, 2008

(87) PCT Pub. No.: WO2006/024231
PCT Pub. Date: Mar. 9, 2006

(65) Prior Publication Data
US 2008/0272526 A1    Nov. 6, 2008

(30) Foreign Application Priority Data

| Aug. 31, 2004 | (CN) | 2004 1 0054165 |
| Aug. 31, 2004 | (CN) | 2004 2 0082409 U |
| Sep. 29, 2004 | (CN) | 2004 2 0090673 U |
| Apr. 30, 2005 | (CN) | 2005 2 0041321 U |

(51) Int. Cl.
*C21B 3/04* (2006.01)
*C21B 7/14* (2006.01)
*C21B 3/06* (2006.01)
*C21C 7/00* (2006.01)
*C21D 9/52* (2006.01)

(52) U.S. Cl. .......... 266/227; 266/102; 266/201

(58) Field of Classification Search .......... 266/227, 266/102, 201
See application file for complete search history.

(56) References Cited

FOREIGN PATENT DOCUMENTS
CN    1282795 A    2/2001
(Continued)

OTHER PUBLICATIONS
"PCT International Search Report—International Application PCT/CN2005/001374" dated Nov. 17, 2005.
(Continued)

*Primary Examiner* — Jessica L. Ward
*Assistant Examiner* — Alexander Polyansky
(74) *Attorney, Agent, or Firm* — Hamre, Schumann, Mueller & Larson, P.C.

(57) ABSTRACT

A double cavity type steel slag treatment equipment by barrel method employing mandrel support comprises left and right barrel bodies, flow branching pan, mandrel, feed funnel. Between the left and right barrel bodies is disposed a flow branching pan, over which is mounted a feed funnel and below which is mounted a retaining ring. The mandrel is fixedly connected to the left and right barrel bodies and flow branching pan, supporting bearings are mounted at two ends of the mandrel, left and right barrel bodies have inner and outer portions, inner barrel body is made of grid section, one end of grid section is fixed on the end cover of outer barrel body through an insertion opening made of supporting rings, the other end of grid section is joined with the supporting ring fixedly connected on outer barrel body.

7 Claims, 15 Drawing Sheets

FOREIGN PATENT DOCUMENTS

| | | | |
|---|---|---|---|
| CN | 1141401 C | * | 10/2001 |
| CN | 1318648 | | 10/2001 |
| CN | 1318648 A | | 10/2001 |
| CN | 1141401 C | | 3/2004 |
| GB | 296682 | | 9/1928 |
| GB | 2 278 789 A | | 12/1994 |
| GB | 2278789 | | 12/1994 |
| JP | 10-244177 | | 9/1998 |
| JP | 2001-208483 A | | 8/2001 |
| SU | 1622313 A1 | | 1/1991 |
| SU | 1662313 A1 | | 1/1991 |

OTHER PUBLICATIONS

Extended European Search Report issued by the European Patent Office Jan. 21, 2008.

Extended European Search Report issued in corresponding European Application No. 10152190, dated Mar. 29, 2010 (6 pages).

Communication from the European Patent Office issued in corresponding European Application No. 05781781.9, dated Apr. 23, 2010 (5 pages).

* cited by examiner

PRIOR ART

PRIOR ART

DRUM APPARATUS FOR TREATING SLAG

TECHNICAL FIELD

This invention relates to an equipment for treating metallurgical molten slag in hot state.

BACKGROUND ART

The existing metallurgical slag treatment equipment by barrel method is one of currently advanced slag treatment equipments. It has advantages of short flow path, less investment, safety, reliability and low energy consumption, the slag, after having been treated, can be utilized directly, and the pollution is low. The metallurgical slag treatment technology and equipment by barrel method, in particular, a vertical feed double cavity barrel equipment can overcome the inadequacy of traditional slag treatment process and equipments, it has the advantages of short flow path, less investment, convenient operation, low energy consumption and good quality of treated product slag. A prior art patent CN 1141401 C discloses "A Steel Slag Treatment Equipment by Double Cavity Barrel method" for treating steel slag. Please refer to FIG. 1, the equipment has two oppositely open squirrel-cage type barrel bodies consisting of backing rings 16, grid sections 31 and rotary end covers, wherein the grid sections and backing rings are connected together with bolts. Between the open sides of the two barrel bodies there is disposed a flow branching pan 9 capable of synchronously rotating, which divides the two barrel bodies into two relatively independent cavity bodies. The force moment causing the rotation of flow branching pans comes from a mandrel 6. The lower part of flow branching pan is a stationery retaining ring 12 of semi-ring shape having the function of separating the two cavity body and preventing the leakage of slag material 7 and cooling media 8. Below the barrel body is a discharge funnel 13 for discharging pulverized slag. Below the four backing rings are disposed eight sets of supporting roller devices 15 arranged respectively at a certain definite angle supporting the rotating parts of the equipment. A fixed hood 14 having a sealing function is located outside the rotary barrel body. During operation, steel slag is fed into funnel 1, falls onto the flow branching pan 9, and is guided respectively into two barrel bodies, after being cooled and crushed, by cooling body 8 (steel balls) leaks out through the slits between the grid sections, and is discharged out of the equipment through discharge flannel 13. The vapor generated in the process is collected by the fixed hood and discharged through specially provided shell and flue. The equipment uses vertical slag feeding, thus solving the problem of feeding slag of high viscosity relatively perfectly. But its disadvantages are, the barrel is a single layer barrel body construction, thus the cooling of slag material is not sufficient and red slag tends to appear; there are relatively too many supporting devices and the equipment is heavy; its lower space is limited, thus maintenance and repair are inconvenient.

In addition, in the existing double cavity type metallurgical slag treatment equipment by barrel method, the retaining ring is located at the lower part of the rotating flow branching pan within the barrel body. The retaining ring comprises a base plate and side plates on which there are many concave pits. The base plate and side plates form a V-shaped cell, in which slag material and many steel balls are filled. Through the base plate there is drilled a discharge hole. Although such a construction protects the retaining rings the resistance during rotation of barrel body is large and further affects the operation of barrel body and the service life of the retaining ring.

Further as is shown in FIGS. 8 and 9, the existing metallurgical slag treatment equipment by barrel method uses a barrel body in the shape of a circular table, its cone portion is outside an inner barrel body and on its cylindrical portion there are many sending plates uniformly distributed peripherally. The sending plates have an inclination angle $\alpha$ with respect to the radial direction. The slag material after being treated in the inner barrel body falls by gravity to the inside of the conical surface of the outer barrel body and is guided on the inclined surface of the conical body into the cylindrical barrel portion, and under the action of sending plates is sent into a discharge chute and through it out of the equipment. This barrel body suffers the disadvantages that it must have a conical shape of inclination angle $\alpha$ in order to discharge slag material, the value of a being equal to the rest (repose) angle of slag material, generally 45°. In his way the slag material coming down from the inner barrel body can be sent axially to the lower part of the discharge chute. According to the geometrical relationship of the construction, the diameter of the outer barrel body equals to the diameter of the inner barrel body plus twice the process width of inner barrel body, as a result, the outer diameter of barrel body is very large, the weight is large and investment is high.

In addition, referring to FIGS. 12 and 13, the process of the existing metallurgical slag treatment by barrel method is such, through a slag feed inlet slag material enters the rotating inner barrel body, which is a squirrel-cage shape barrel body formed by many grid sections, at two ends of which are two end covers, under the inertia the slag material is thrown onto the surface of cooling media (steel balls), then penetrates by gravity into the slits between steel balls to be cooled and crushed, discharged through the grid sections at the bottom of inner barrel body into the outer barrel body. Generally, with the rotation of inner barrel body only the balls and slag material on the upper surface layer and those near the inner barrel body (lower surface layer) will move along the trajectories shown by arrows in FIG. 13 under the action of frictional and gravitational forces, the steel balls in the middle kidney-shaped portion are far away from the inner barrel body, and are thus subjected to less frictional force by the surrounding steel balls, the motion region of which is smaller, even stationery and undergoes no normal heat exchange. As the hot slag material penetrates downward, the temperature of steel balls in this region increases rapidly and can not be cooled timely, that is, loses the normal effect of heat transfer. especially when the viscosity of hot slag material is high and thus the ability of slag material to penetrate into the slits between steel balls is weak, a large part of slag material will cover the upper surface of steel balls region of kidney shape and form "slag crust", where the contact area between slag material and steel balls is small, the steel balls taking part in cooling the slag material are those steel balls at the upper surface layer of balls in the kidney-shaped region, and, therefore, their cooling effect is low, tending to give rise to bursting in the barrel body, and the pulverizing effect is bad, tending to result in the discharge of red slag out of the equipment, not only affecting the service life of subsequent equipments, but also yielding product slag of low performance negating its direct utilization.

SUMMARY OF THE INVENTION

The object of the invention is to provide a double cavity type steel slag treatment equipment by barrel method with mandrel support to reduce weight and cost of equipment and at the same time to increase the space for maintenance and repair of the lower part.

A further object of the invention is to provide a double cavity type steel slag treatment equipment by barrel method with mandrel support which can increase the cooling time of slag material in the equipment and thus improve the cooling effect, resulting in improving the product slag performance.

Another object of the invention is to provide a retaining ring for a double cavity type steel slag treatment equipment by barrel method. The retaining ring overcomes the drawback that the existing retaining ring construction affects the rotation of barrel-body, while the side plates of the retaining ring of the invention have smooth surface offering less frictional resistance to the motion of cooling media and slag material and thus less affecting the rotation of barrel body. The service life of the retaining ring of the invention is long, and the construction of the retaining ring is simple and its cost is low.

Still another object of the invention is to provide a barrel body for the rotation of barrel body, which overcomes the drawback that the existing barrel is large and its investment is high. The barrel body of the invention employs spiral sending plates, making the barrel body have the ability of transporting slag material in axial direction, decreasing the diameter of the barrel body, and reducing the equipment in vestment.

Still another object of the invention is to provide sending hands for a double cavity metallurgical slag treatment equipment by barrel method, which overcomes the drawback that the contact between the highly viscous molten slag and steel balls in existing inner barrel body is small, causing the molten slag in the barrel body of the invention to be sufficiently cooled and crushed.

According to an aspect of the invention, there is provided a double cavity metallurgical slag treatment equipment by barrel method with a mandrel support, comprising left and right barrel bodies, flow branching pans, a mandrel and a feed funnel, wherein the pan is disposed between the left and right barrel bodies and opposed to the flow branching pan are the opening parts of the left and right barrel bodies; over the flow branching pans is disposed a feed funnel, while below the flow branching pan is disposed a retaining ring; the mandrel fixedly connects the left and right barrel bodies and the flow branching pans, wherein, outside the left and right barrel bodies at both ends of the mandrel supporting bearings are mounted.

Preferably, the left and right barrel bodies have two portions, namely inner and outer portions. The inner barrel body consists of grid section, one end of grid section is fixed to the end cover of outer barrel body through the insertion opening formed by supporting rings, the other end of the grid section is joined with the supporting rings on the outer barrel body. The mandrel fixedly connects the outer barrel body. Outside the outer barrel body are mounted geared rings for transmitting force moment, the geared rings are fixedly connected with one end of the outer barrel body.

Preferably, between the inner and outer barrel bodies are mounted spiral sending plates, which are fixed on the inner surface of outer barrel body. The axis of the spiral sending plates forms a certain definite angle (30°-55°) with the axis of the outer barrel body.

Preferably, the said retaining ring has supporting ribbed plates radially arranged between the side plates of the left and right barrel bodies. There is a fixed hood at the periphery of the retaining ring. The retaining ring and fixed hood are fixed on the foundation.

As compared with prior art, this invention adds supporting bearings at two ends of the mandrel while maintaining double barrel bodies and vertical feed, the weight of equipment is shared equally by two bearing seats. Further, this invention eliminates the use of supporting rollers and backing rings, greatly decreasing the weight and manufacturing cost of the equipment, and simplifies the lower construction, giving a large space for maintenance and repair. The whole construction of equipment is compact. Because of the use of mandrel support, the bearings can accomplish good axial orientation, solving the problem of axial scurry which troubles the barrel equipment.

Further, at the periphery of inner barrel body an outer barrel body capable of synchronously rotating is added, and within the outer barrel body are provided spiral sending plates, the axis of which forms a certain definite angle with the axis of the barrel. The spiral sending plates causes a certain definite quantity of water to be present in the outer barrel body, intensifying the cooling effect of the outer barrel body. This increases the cooling time of slag material in the barrel body and ensures that the product slag be discharged at the set regions.

At the same time, in order to prevent seizure of the retaining ring, the mother board at the lower part of the retaining ring is eliminated and the left and right side plates are supported by ribbed plates of radial shape, causing all the slag material that can enter the clearance between the retaining ring and flow branching pan to be rapidly and smoothly discharged, meanwhile effectively reducing the weight of equipment, the upper part of discharge funnel is fixedly connected with the fixed hood, its lower part is connected with the inlet of a slag material transport device. The invention can effectively ensure that the metallurgical slag of various states (liquid state, glass state, even solid state less 300 mm in size can smoothly enter the equipment; the slag material is cooled sufficiently, and the performance of product slag is stable, the weight of equipment is small and its cost is low; the space available for maintenance and repair is large.

According to another aspect of the invention, there is provided a retaining ring for the double cavity type metallurgical slag treatment equipment by barrel method, comprising a base plate, side plates and ribbed plates, the base plate being a circular strip plate for the most part, side plates being annular plates. The arrangement of side plates and the base plate is ⊢ shaped, two side plates are mounted in parallel on the base plate at an inward distance from the side surface of the base plate, the distance being equal to the width of the base plate itself. At the inside of the side plate is mounted a ribbed plate.

Preferably, the inward distance at which the side plate is mounted on the base plate is 50-150 cm; the mounting position of side plate is semi-ring in shape, high at the rear and low at the front.

As compared with the prior art, the surface of the side plates of the invention is smooth, and the side plate is mounted at an inward distance from the side face of the base plate, this inward distance from the side face of the base plate is just for the cooling media (steel balls) to stick to the side plate, being motionless or slightly moving during rotation of the barrel body, and thus accomplishing the object that the side plate is less worn out and at the same time the rotation of barrel body is less affected. The retaining ring is of a semi-circular ring construction and has a certain clearance with both the barrel body and the flow branching pan, in this way, playing a role of closing the slag material and process media and protecting the flow branching pan to prevent the direct wear of the surface of the flow branching pan by the action of the slag material and process media. This invention has features of long service life, low resistance to the rotation of barrel body, simple constriction and low cost.

According to a further aspect of the invention, there is provided a barrel body for a metallurgical slag treatment equipment by barrel method, within the barrel body is disposed an inner barrel body, on the inner surface of the barrel body there are spiral sending plates uniformly distributed along the inner surface of the barrel.

The above-mentioned metallurgical slag treatment equipment uses a barrel body. The said sending plates have planar or spiral shaped surface.

As compared with the prior art, the barrel body of the invention employs spiral sending plates in place of the conical face of the original barrel body, while securing normal discharge, it simplifies the circular table type barrel body, decreasing the diameter of barrel body, optimizing the equipment construction, reducing the weight of the equipment. The construction is simple and the manufacturing cost of the equipment is reduced.

According to another aspect of the invention, on the inner wall of the inner barrel body of the inner barrel there are mounted convex sending hands. Preferably, on the grid sections of the inner barrel there are sending hands, the cross-section of which being L-shaped or inverted Π-shaped. The steel balls can fall down from the L-shaped or inverted Π-shaped sending bands.

Preferably, on the end cover of the said inner barrel body are mounted sending hands at the end of which is mounted a guide plate. The sending hands are radially arranged about the center of the end cover.

As compared with the prior art, on the grid sections of the inner barrel body and the end cover of the present invention are mounted convex sending hands, which scoop up the steel balls near the surface of inner barrel body and throw the steel balls onto the fallen slag region according to the set direction and angle via the sending hands on the grid section and the guide plates of the sending hands on the end cover, striking, crushing and cooling intensively the slag piles or slag crusts produced by the highly viscous molten slag. Meanwhile, the steel balls and slag material near the grid sections and end cover are continuously carried off, the nearby steel balls are continuously supplied, resulting in the downward and sidewise movement of the steel balls and slag material in the original relatively "motionless" kidney shaped region (see the arrows in FIGS. 14 and 16), and thus eliminating the kidney-shaped "dead zone", giving full play to the heat transfer function of all steel balls. The treatment method of the invention, therefore, has features of easy implementation, simple construction, low-cost and excellent effect.

BRIEF DESCRIPTION OF ACCOMPANYING DRAWINGS

In the following, the invention will be further explained in conjunction with the accompanying drawings.

Figure 4:
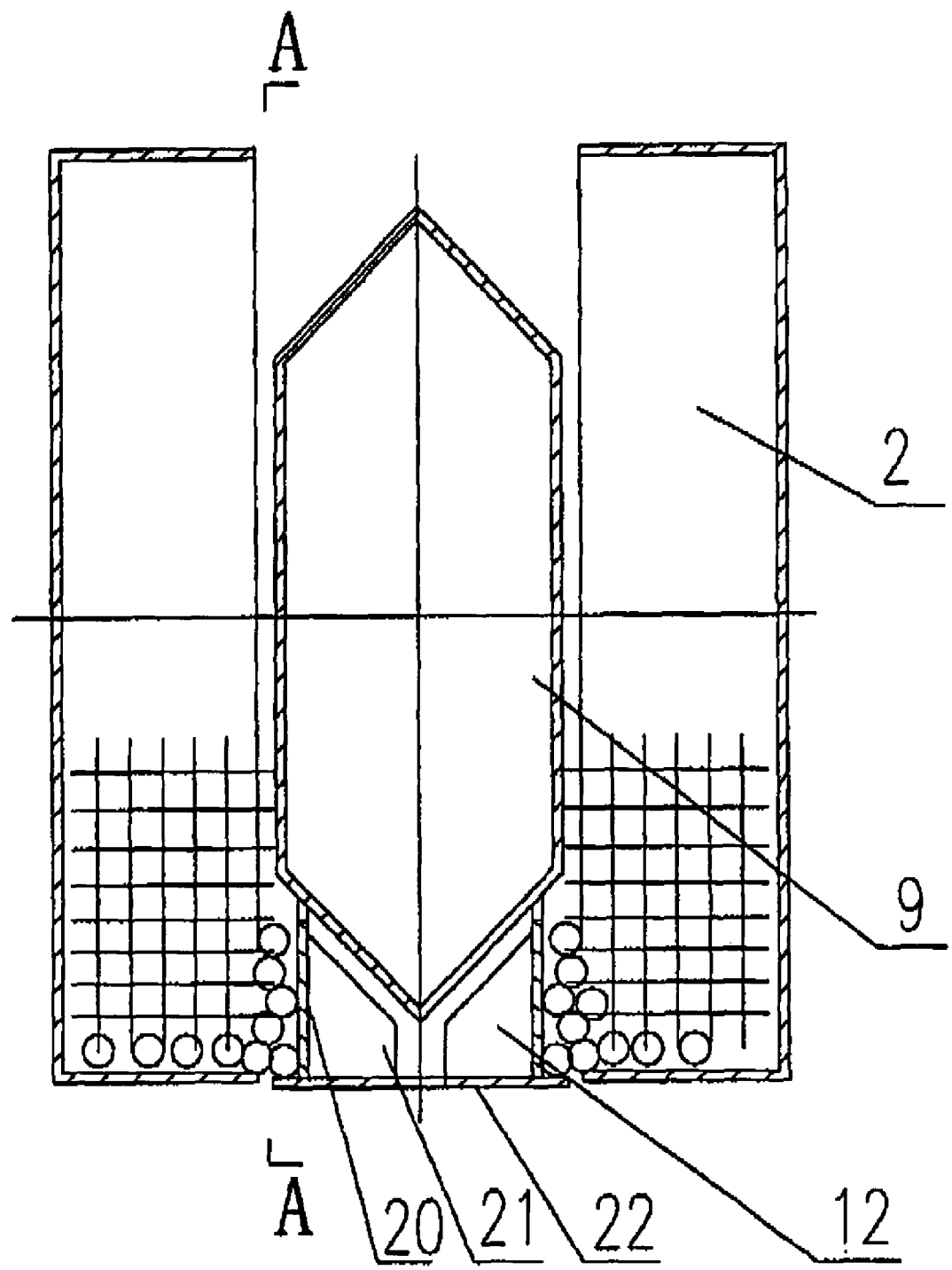
Figure 5:
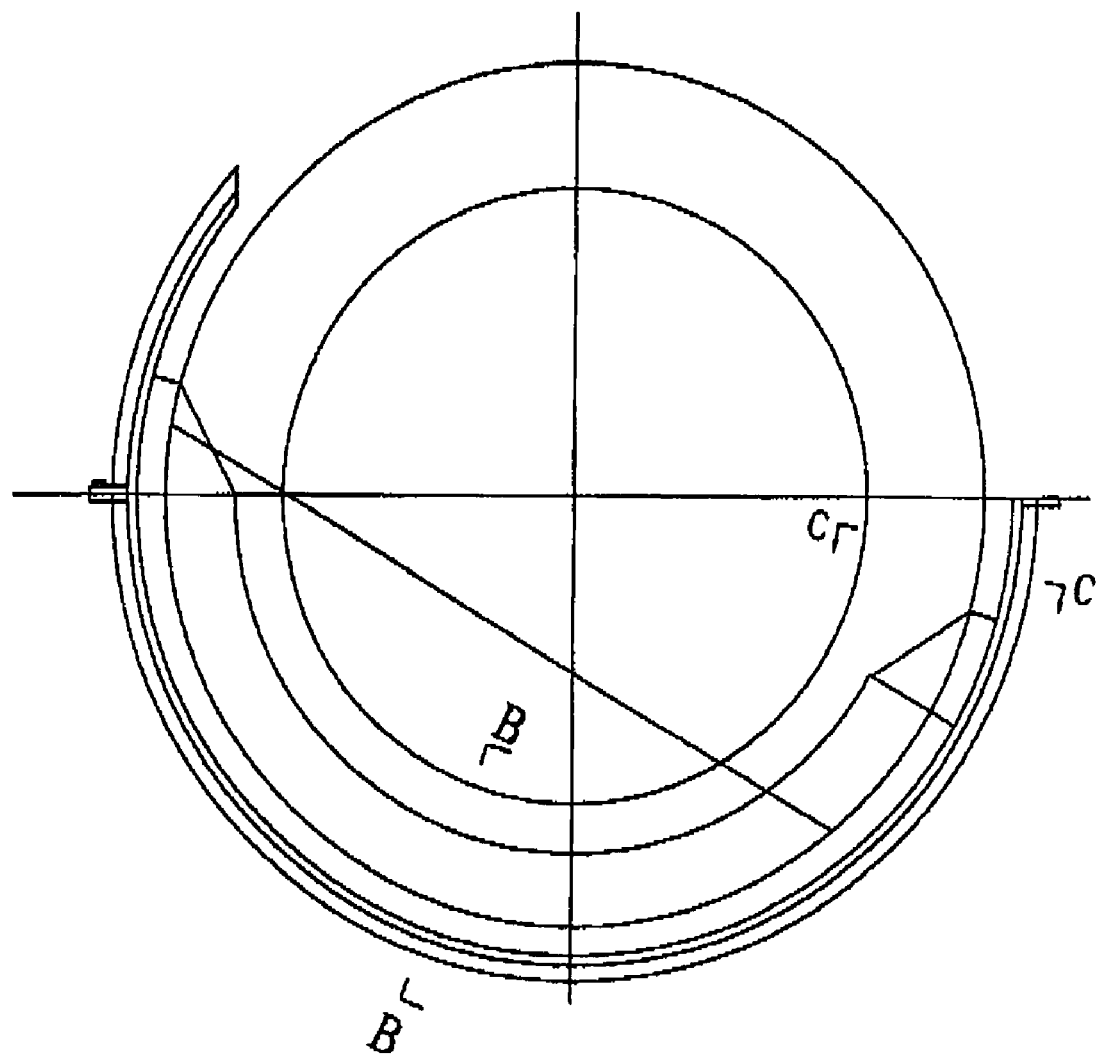
Figure 6:
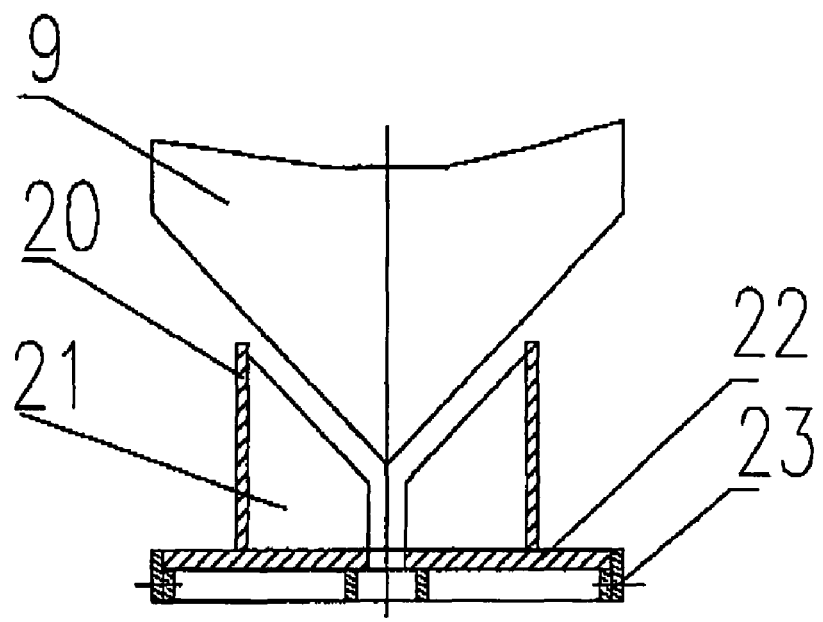
Figure 7:
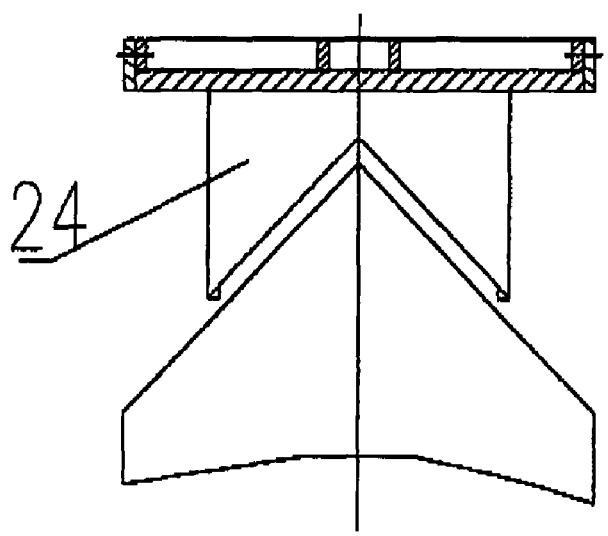
Figure 8:
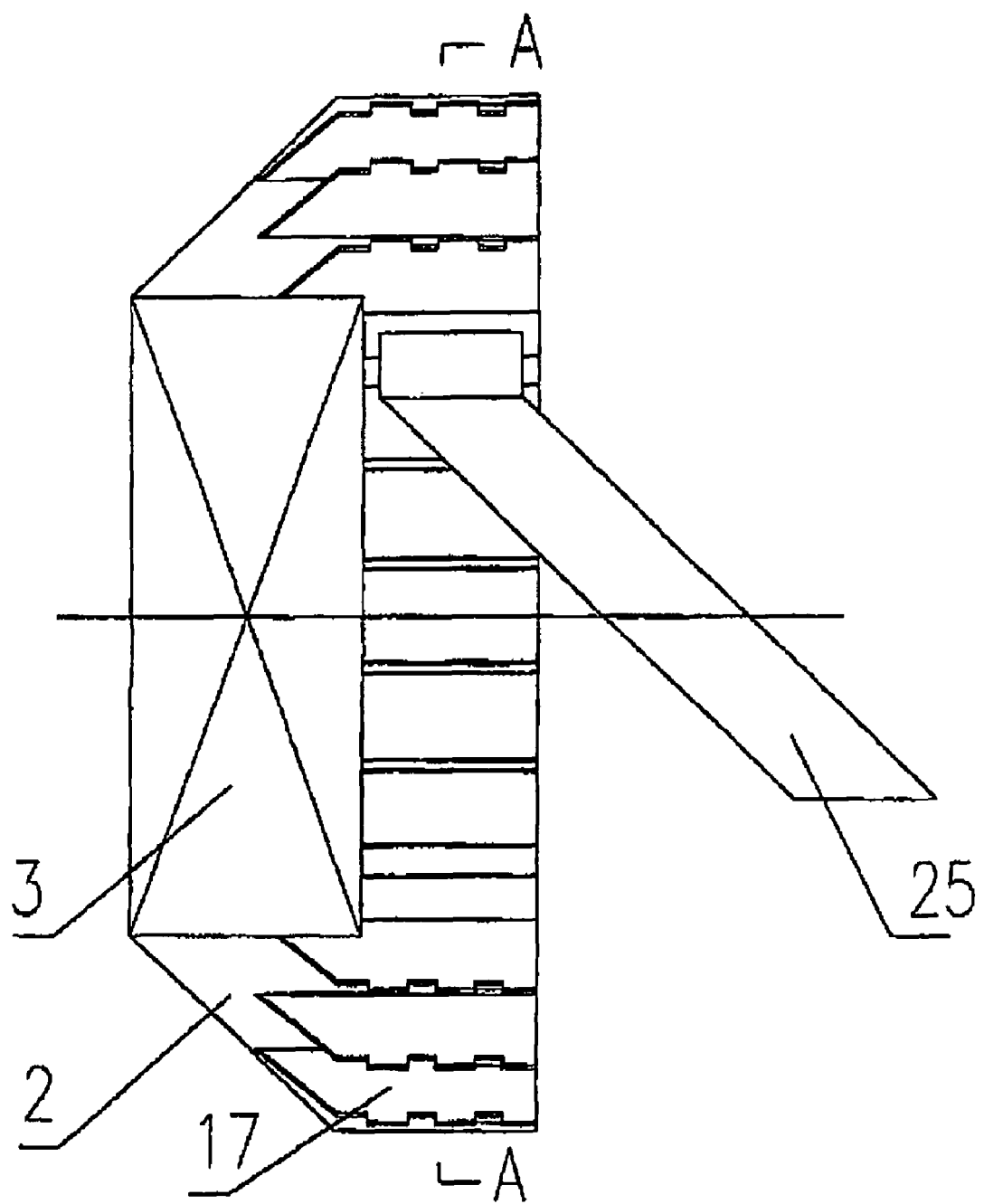
Figure 9:
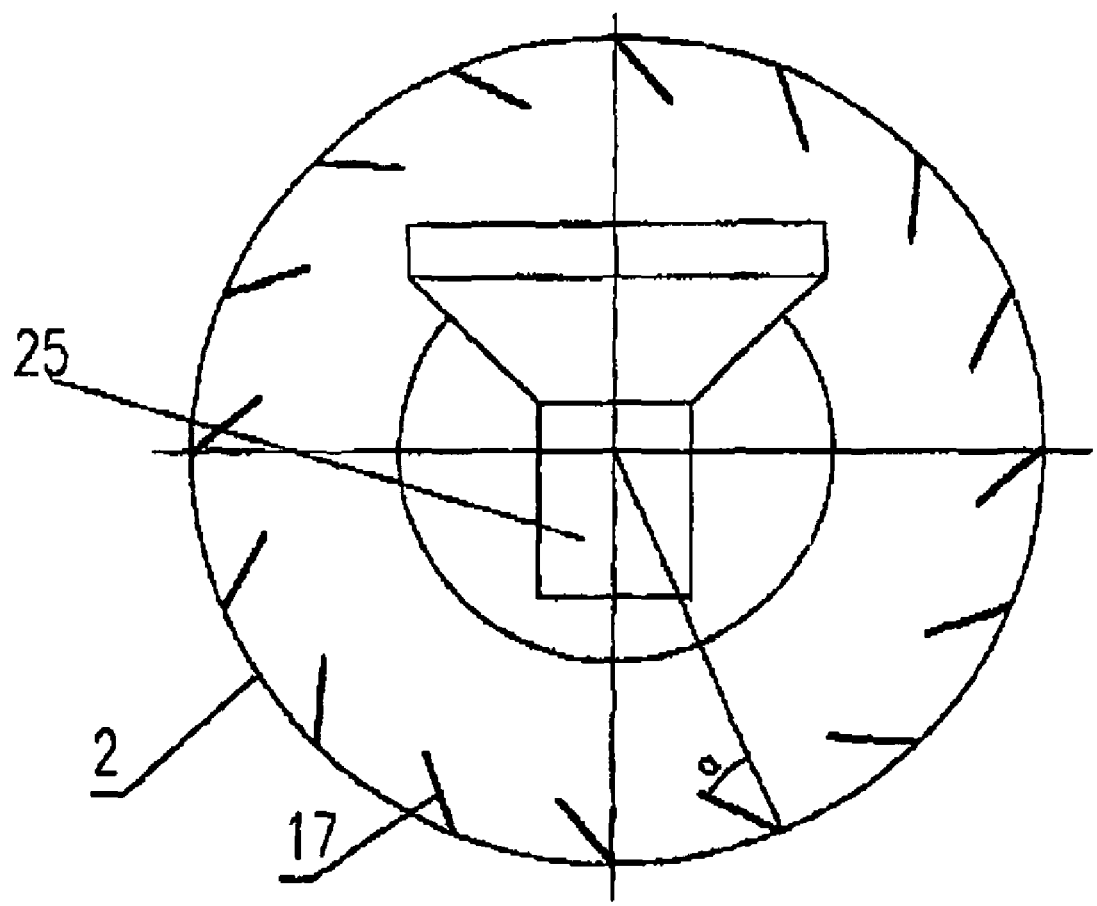
Figure 10:
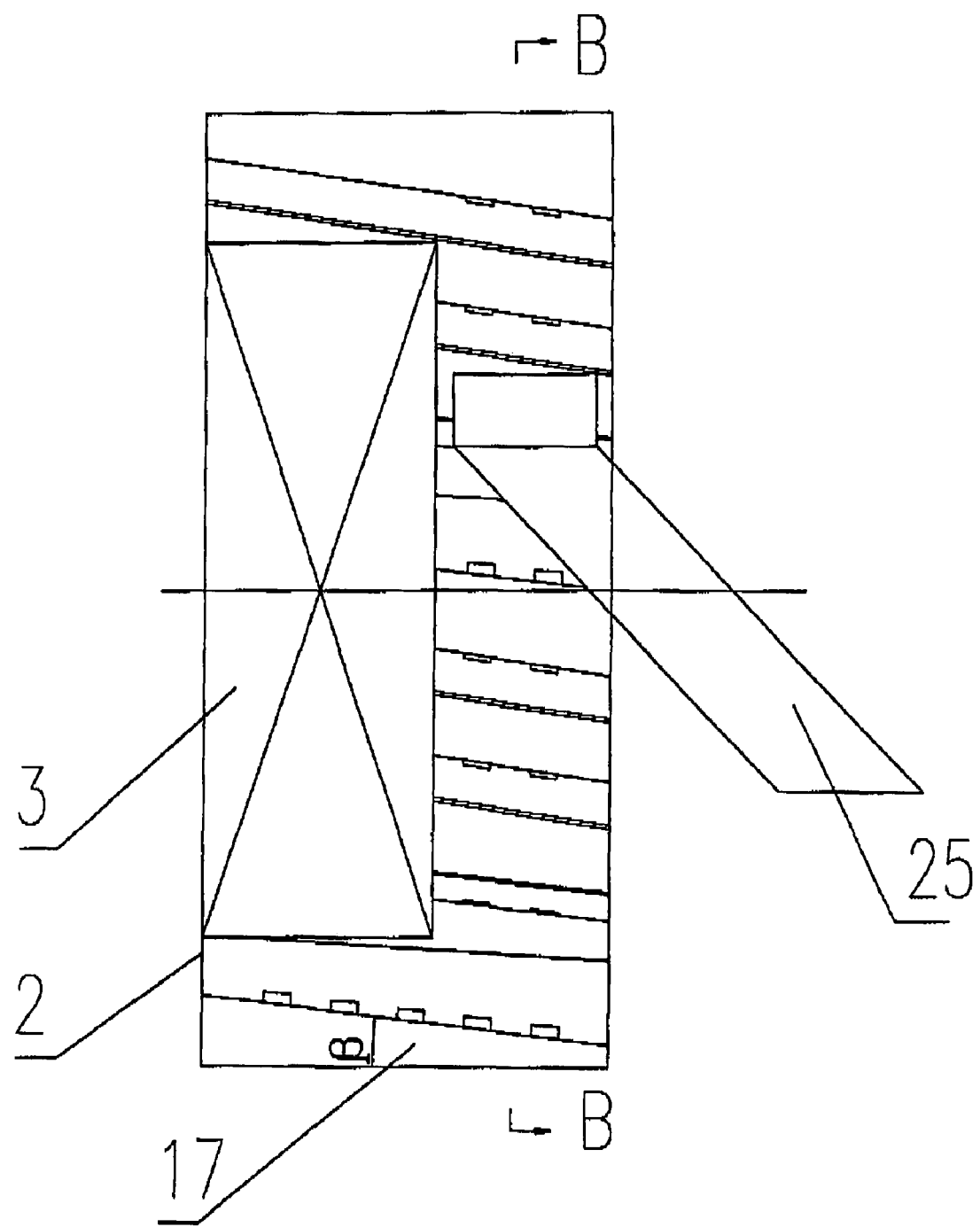
Figure 11:
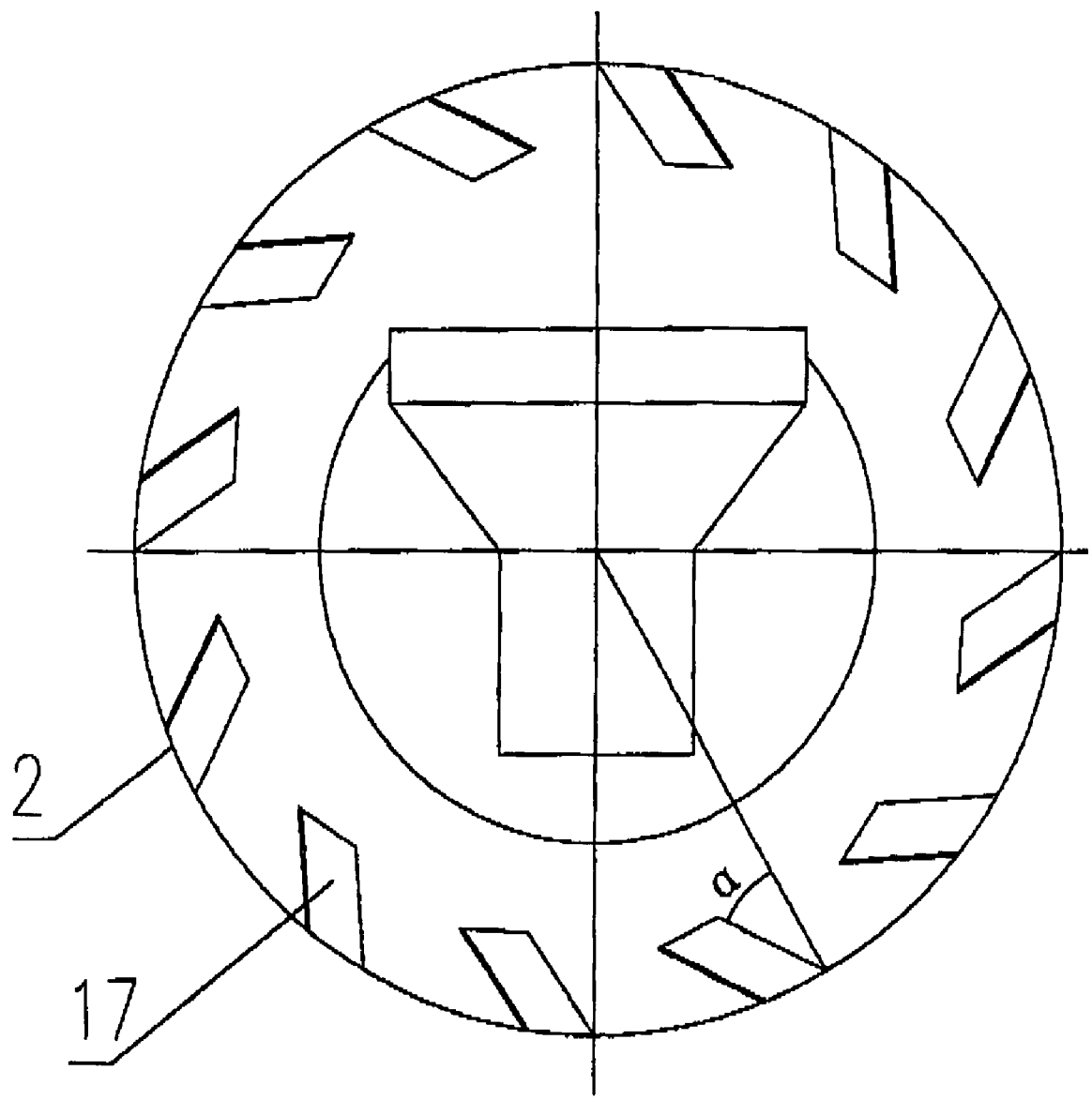
Figure 12:
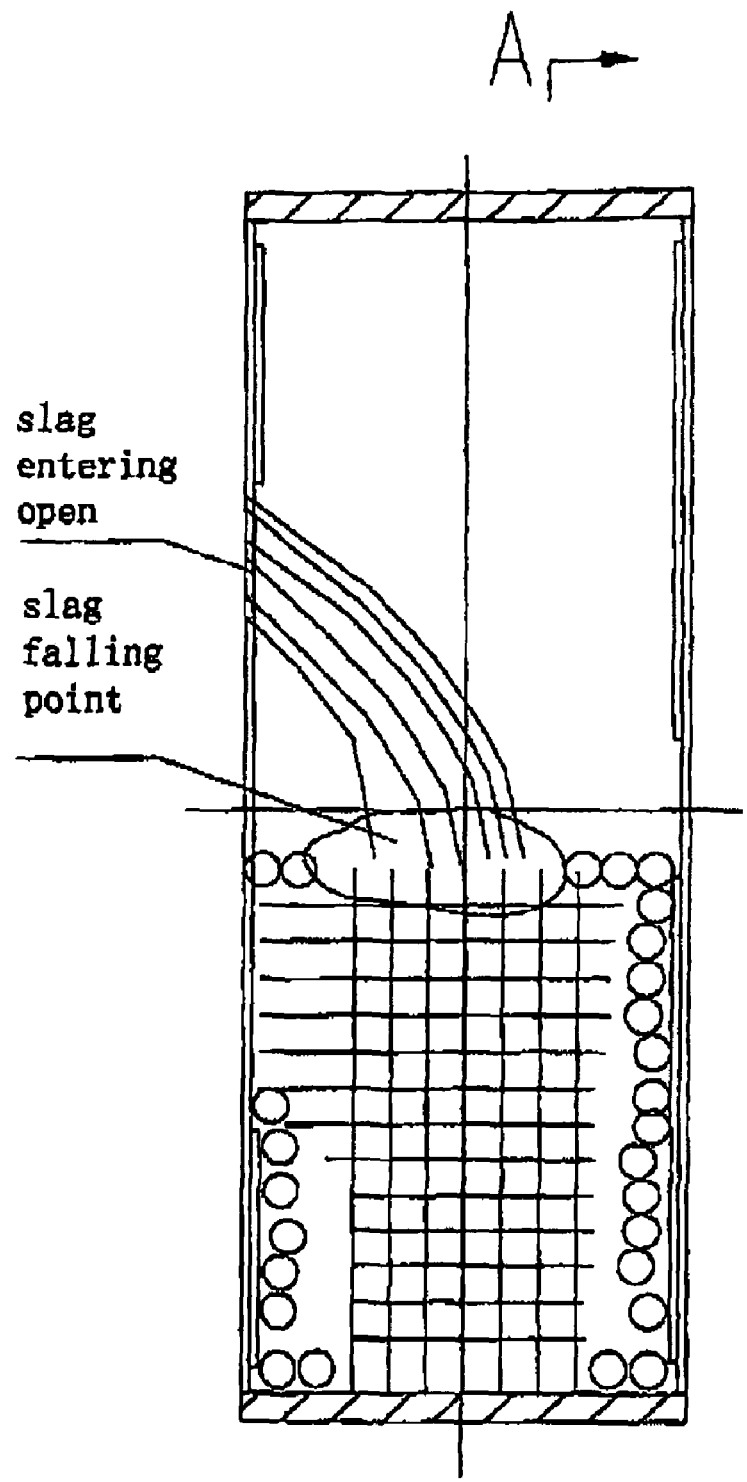
Figure 13:
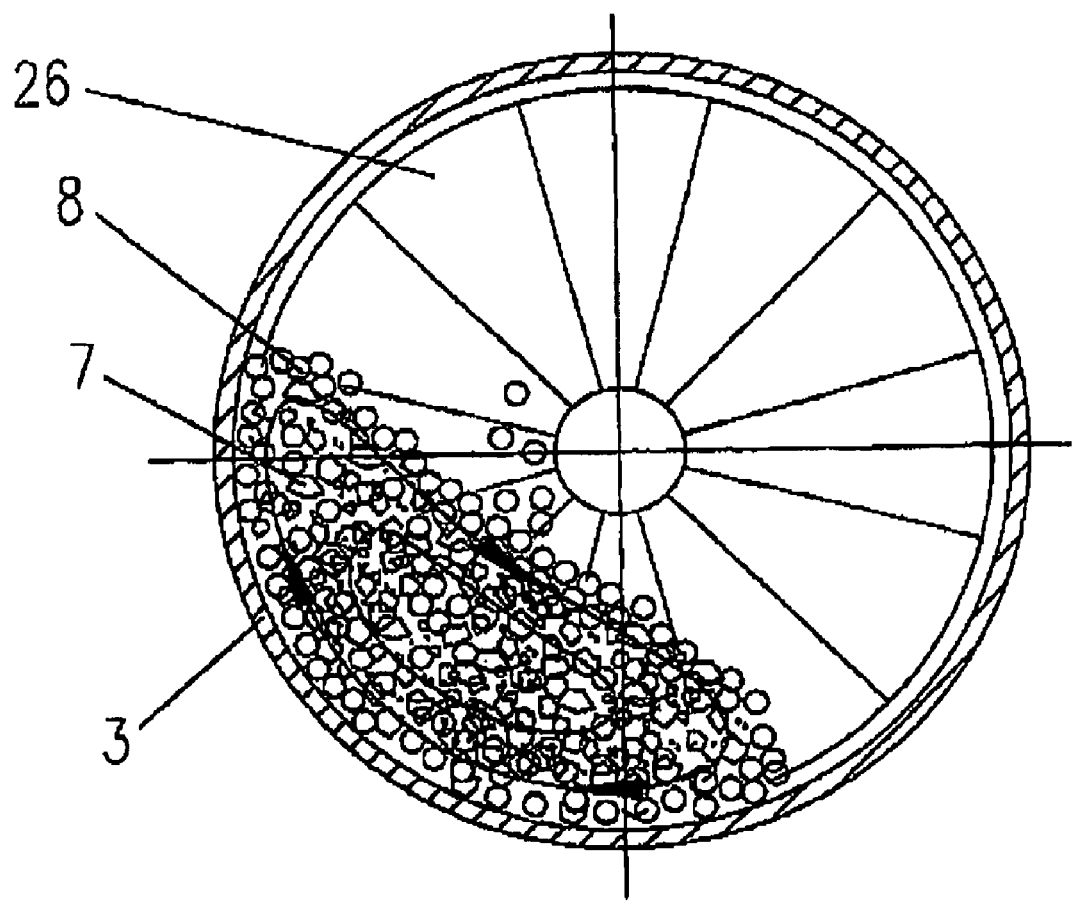
Figure 14:
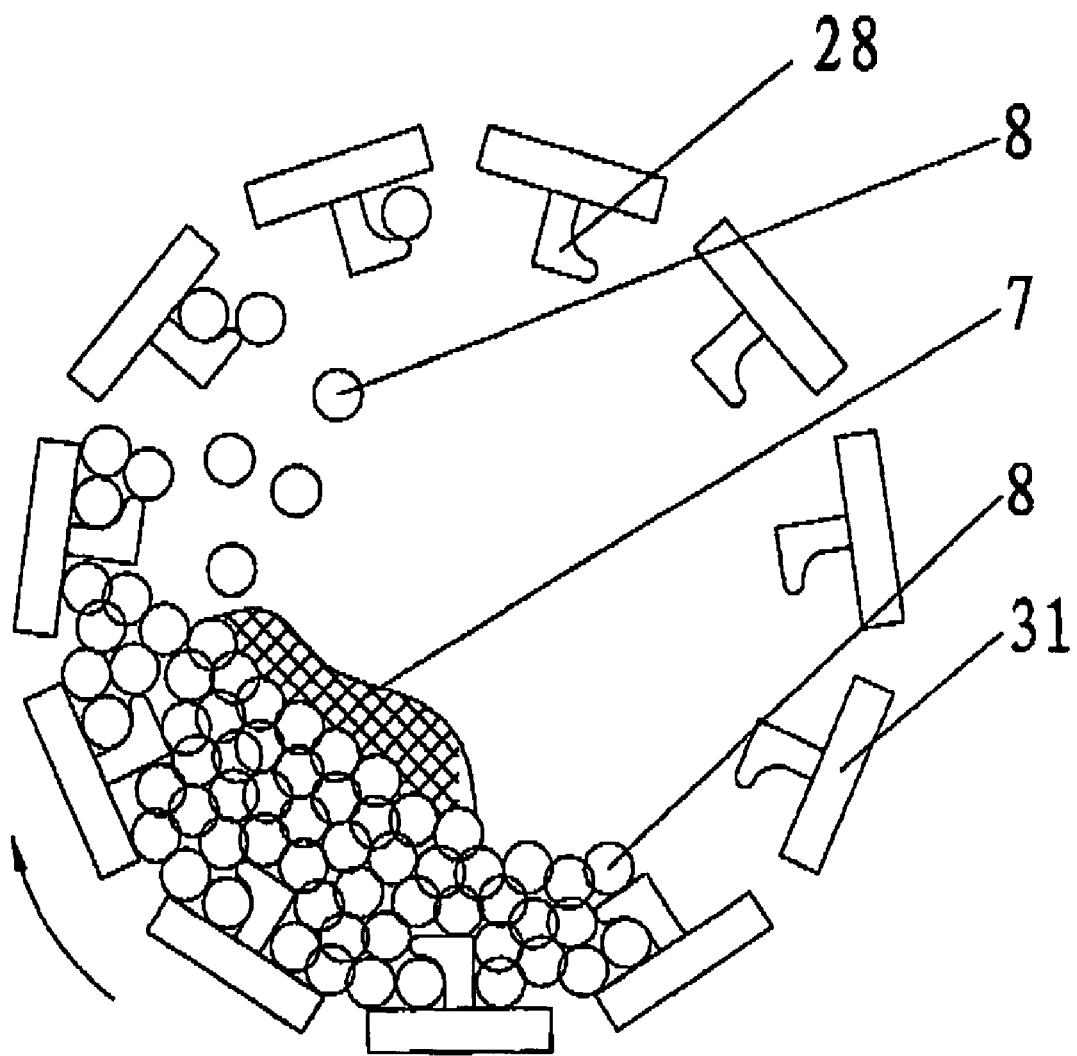
Figure 15:
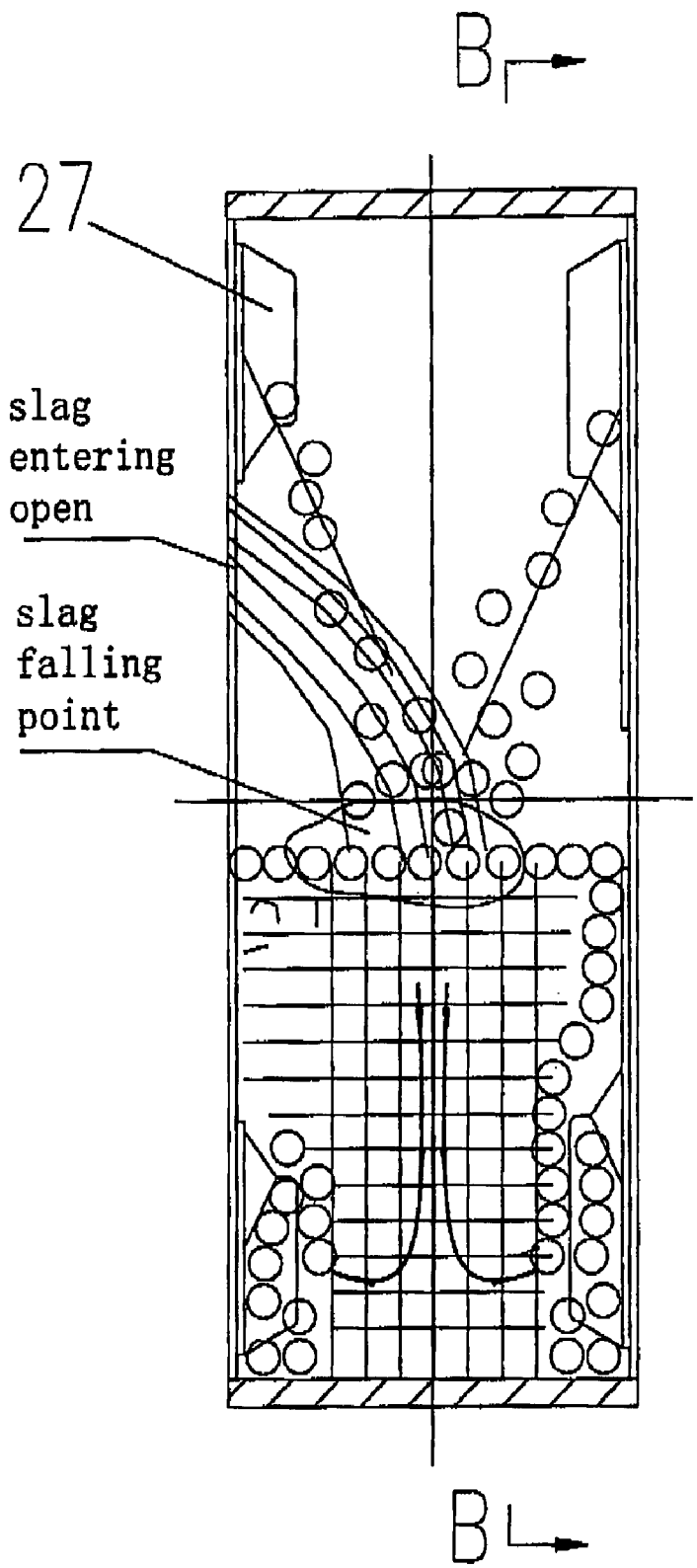
Figure 16:
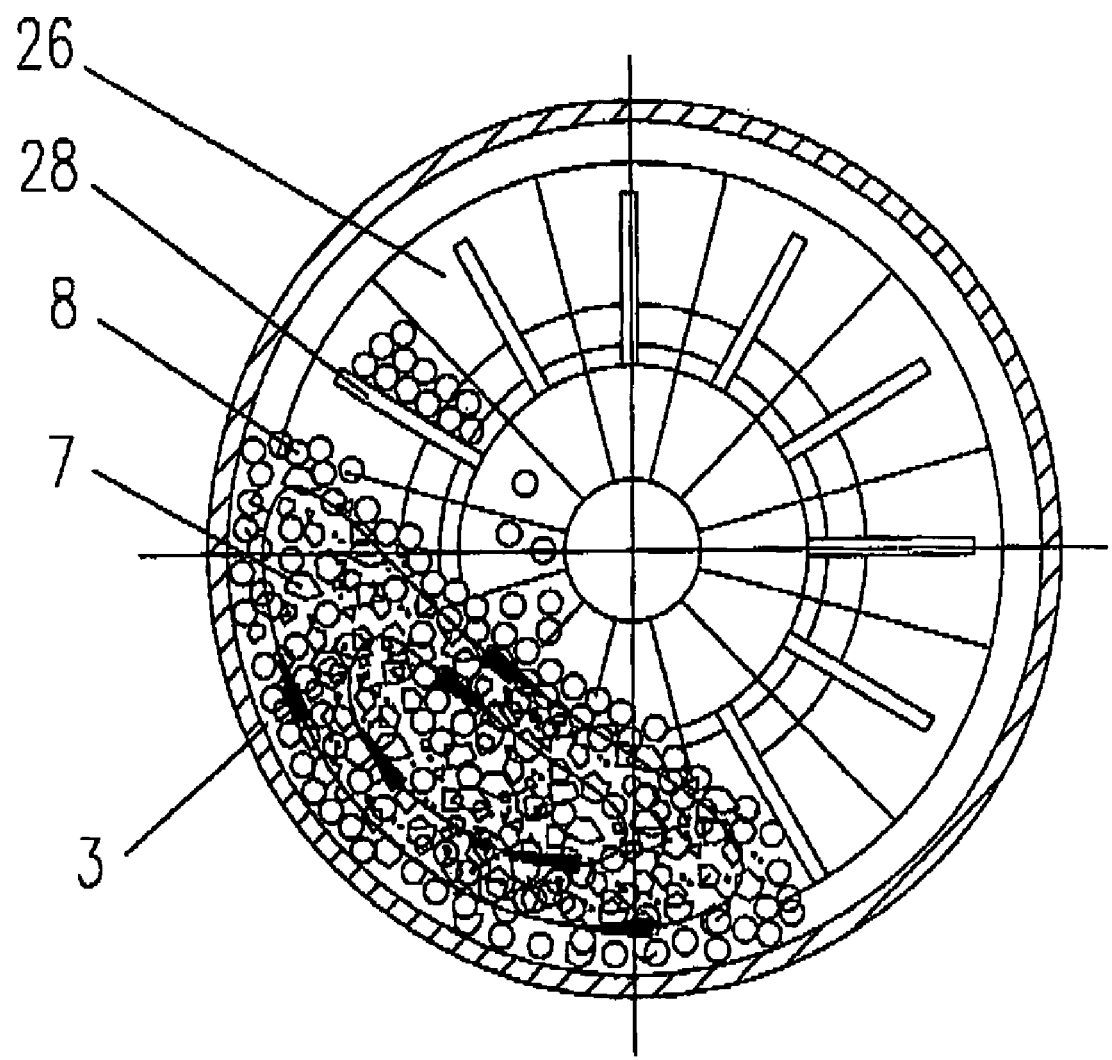

wherein, 1 feed funnel, 2 outer barrel body, 3 inner barrel body, 31 grid section, 4 supporting bearing, 5 geared ring for transmitting moment 6 mandrel, 7 slag material, 8 cooling body (steel ball), 9 flow branching pan, 10 fastener for fixing the grid sections, 11, 18, 19 supporting rings for supporting the grid sections, 12 retaining ring, 13 discharge funnel, 14 fixed hood, 15 supporting roller, 16 backing ring, 17 spiral sending plate;

FIG. 4 is a schematic view of the construction of a retaining ring for the double cavity type steel slag treatment equipment by barrel method according to the invention;

FIG. 5 is a sectional schematic view of FIG. 4 along A-A;
FIG. 6 is a sectional schematic view of FIG. 5 along B-B;
FIG. 7 is a sectional schematic view of FIG. 5 along C-C;

Wherein, 12 retaining ring, 9 flow branching pan, 2 outer barrel body, 20 side plate, 21 ribbed plate, 22 base plate, 23 backing (lining) board, 24 cover plate;

FIG. 8 is a schematic view of the construction of outer barrel body for an existing metallurgical slag treatment equipment by barrel method;

FIG. 9 is a sectional view of FIG. 8 along A-A;
FIG. 10 is a schematic view of the construction of a barrel body for a metallurgical slag treatment equipment by barrel method according to the present invention;

FIG. 11 is a sectional view of FIG. 10 along B-B;

Wherein, 3 inner barrel body, 2 outer barrel body, 17 radially inclined sending plate, 25 discharge chute;

FIG. 12 is a schematic view of the construction of an existing metallurgical slag treatment process;

FIG. 13 is a sectional view of FIG. 12 along A-A;

FIG. 14 is a schematic view of the construction of an embodiment of the metallurgic slag treatment equipment by barrel method (sending plates are mounted on grid sections) according to the present invention;

FIG. 15 is a schematic view of the construction of another embodiment of the metallurgic slag treatment equipment by barrel method (sending plates are mounted on end cover);

FIG. 16 is a sectional view of FIG. 15 along B-B;

wherein, 3 inner barrel body, 8 steel ball, 7 slag material, 28 sending hand, 31 grid section, 26 end cover, 27 guide plate.

BETTER MODE FOR CARRYING OUT THE PRESENT INVENTION

Figure 1:
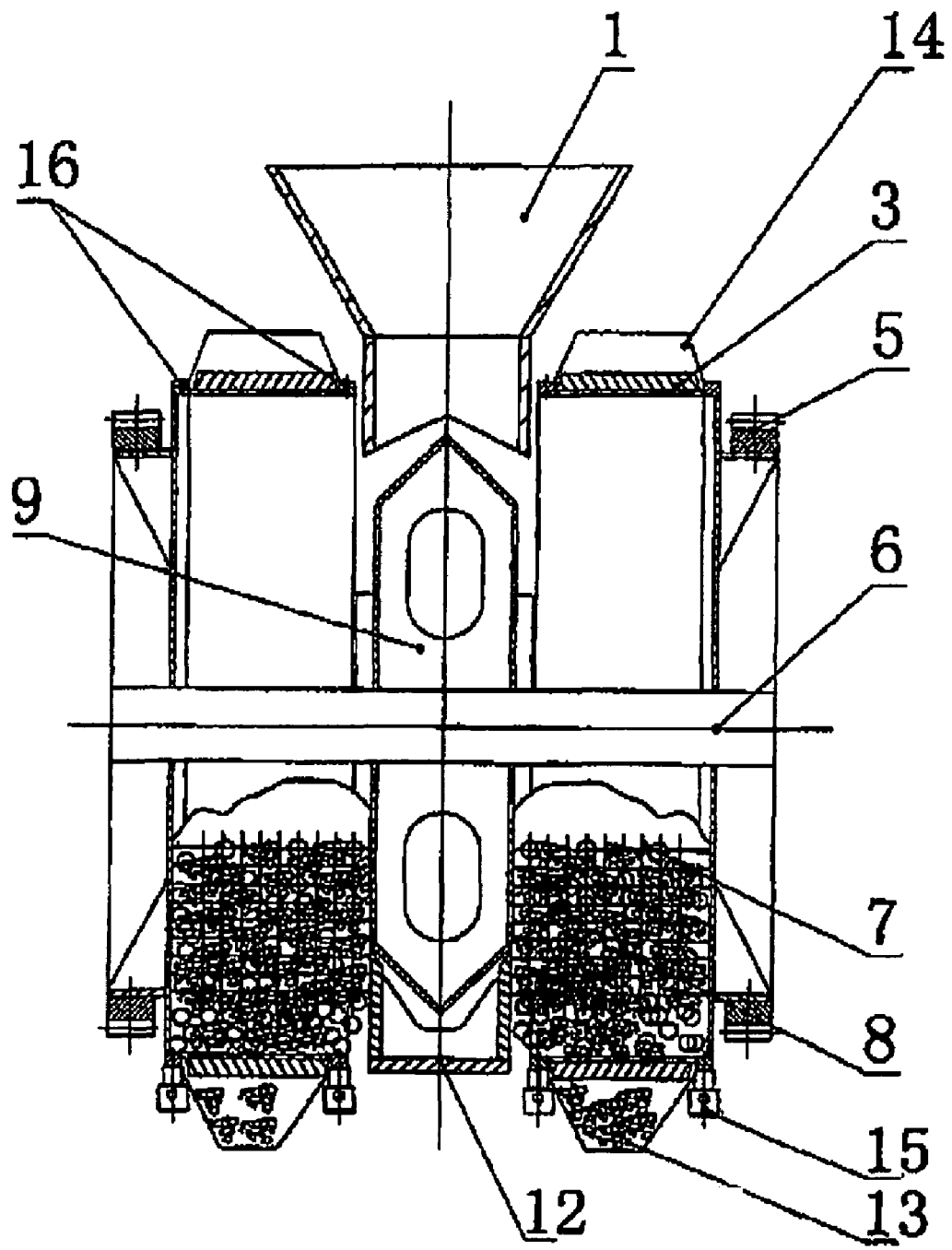
FIG. 1 is a schematic view of the construction of a double cavity type steel slag treatment equipment by barrel method disclosed in the prior art patent CN 1141401C.
Figure 2:
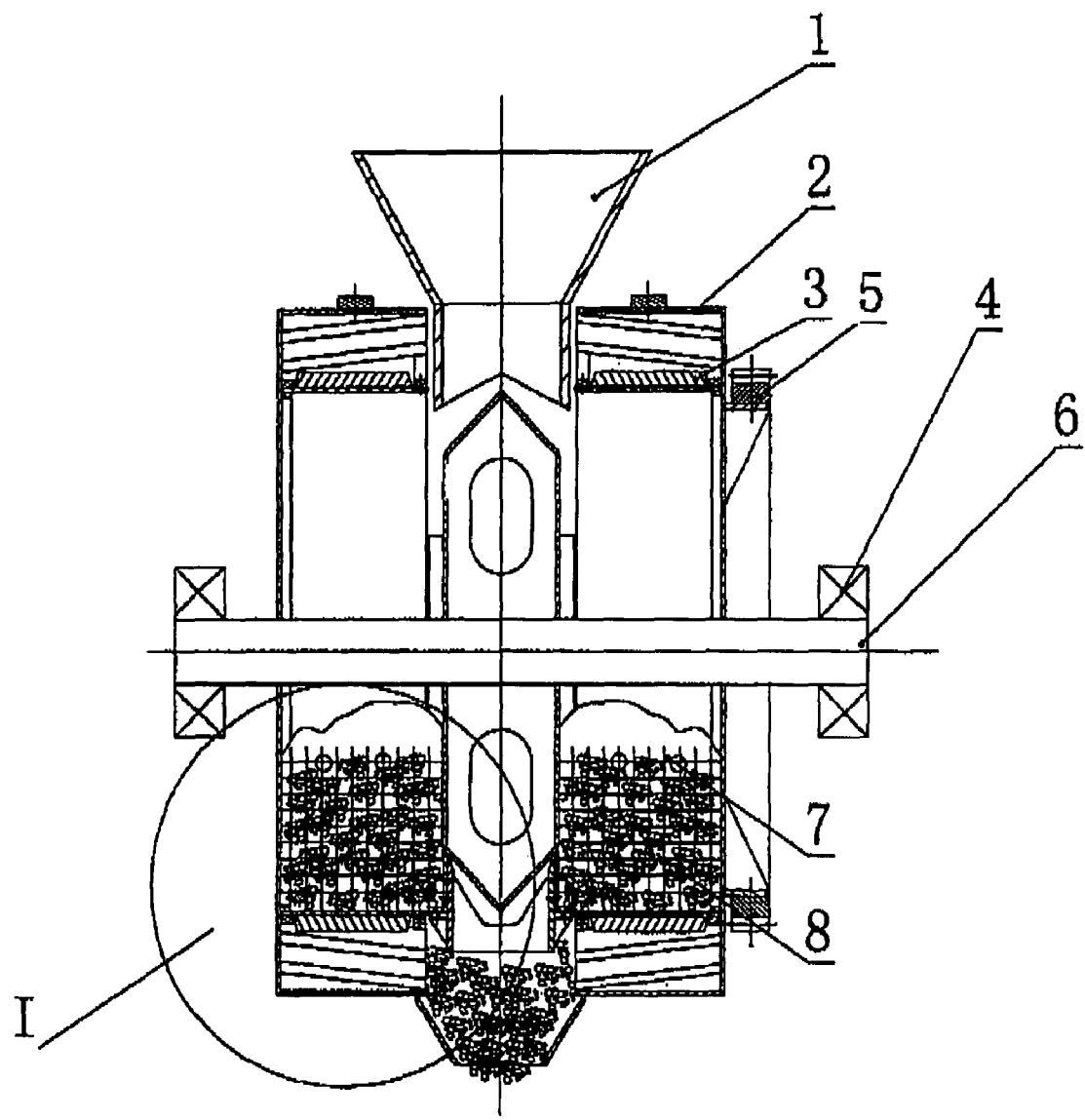
FIG. 2 is a schematic view of the construction of a double cavity type steel slag treatment equipment by barrel method using mandrel support according to the present invention.
Figure 3:
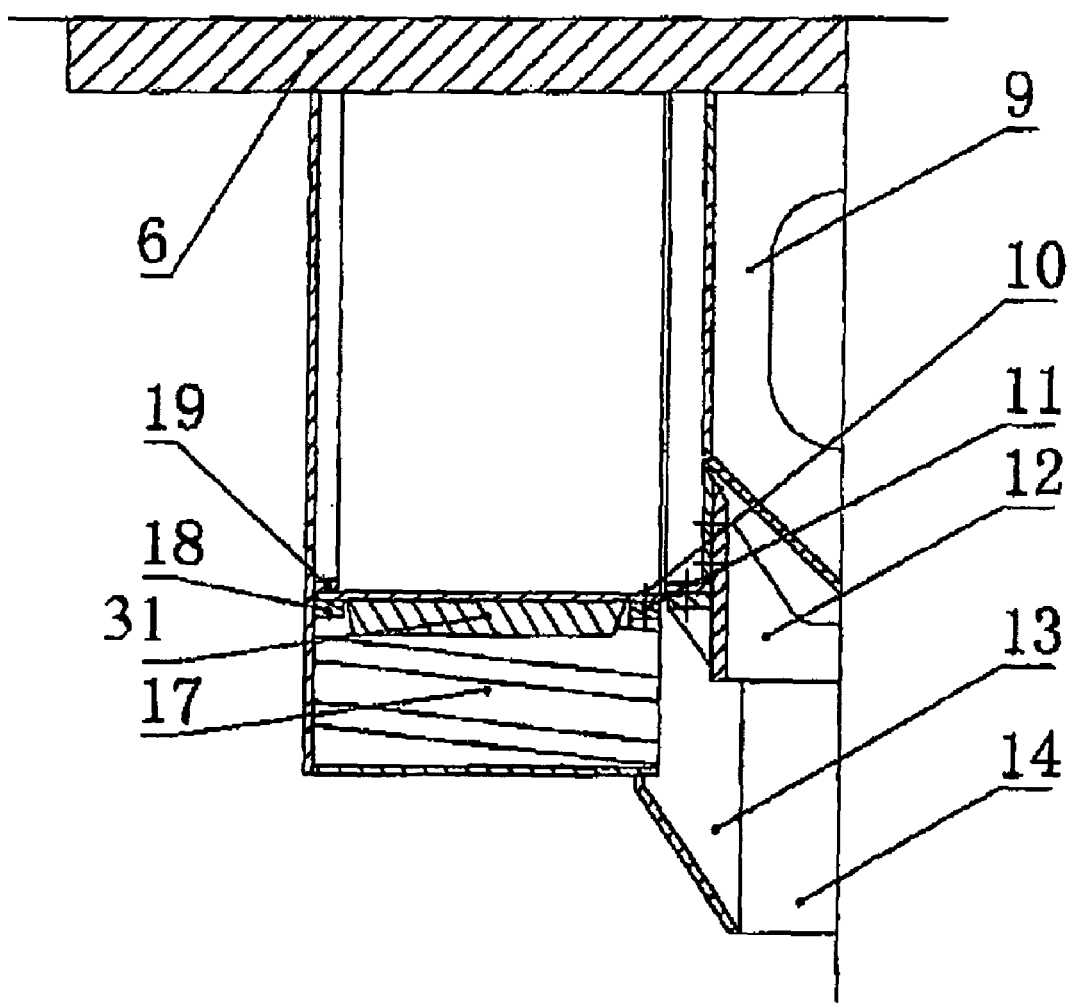
FIG. 3 is a local enlarged schematic view of a barrel.

Referring to FIG. 2 and 3, there is provided a steel slag treatment equipment be barrel method comprising left and right barrel bodies 2, flow branching pan 9, mandrel 6, feed funnel 1; the left and right barrel bodies have two layers (inner and outer barrel bodies); the left and right outer barrel bodies 2 arc respectively connected to mandrel 6; inner barrel body is composed of grid sections 31, one end of which is fixed on the end cover of outer barrel body 2 through the insertion opening formed by supporting rings 18,19, the other end of grid section 31 is joined with the supporting ring 11 fixed on outer barrel body 2 via a fastener 10. Between inner barrel body 3 and outer barrel body 2 are mounted sending plates 17 fixed on the inner surface of outer barrel body 2. The axis of sending plates 17 form an angle (30°-55°) with the axis of outer barrel body. Between left and right barrel bodies there is disposed a flow branching pan 9 fixedly connected to mandrel 6. Mandrel 6 is supported by bearings 4 located at outer sides of the left and right barrel bodies. At one end of mandrel 6 a driving geared ring 5 is fixedly connected, which is located at the outer side of the outer barrel body 2. At the lower part of flow branching pan 9 is disposed a retaining ring 12, which forms a gap fit respectively with flow branching pan 9 and inner barrel body 3. Retaining ring 12 has supporting ribbed plates radially disposed between two side plates of left and right barrel bodies. The lower pant of retaining ring 12 is empty. Retaining ring 12 is directly fixed on the foundation. At the periphery of retaining ring 12 is disposed a fixed hood 14, which forms a gap fit with outer barrel body 2.

The fixed hood 14 is used for collecting the slag material and vapor discharged from outer barrel body 2. Fixed hood 14 is also fixed on the foundation. Above flow branching pan 9 is a feed funnel 1, which forms a gap fit with flow branching pan 9 and is directly fixed on the foundation. The upper part of discharge funnel 13 is fixedly connected with fixed hood 14, while its lower part is connected with the inlet of a slag material transport device.

Referring to FIG. 4-7, according to the invention there is provided a retaining ring 12 for the double cavity type metallurgical slag treatment equipment by barrel method. It comprises base plate 22, side plate 20, cover plate 24 and ribbed plate. The base plate 22 is of a frame construction covered with circular shaped slat for the most part to secure the rigidity of retaining ring 12; on two sides of base plate 22 are covered with backing (lining) boards 23 connected with base plate 22 by means of bolts for easy assembling and disassembling, on base plate there is a discharge hole for timely discharge of a small amount of slag material, carried down from flow branching pan 9 out of retaining ring 12. Side plate 20 is an annular plate. Two side plates 20 are mounted in parallel on base plate 22 at an inward distance from the side surface of base plate 22, the distance being 50-150 cm, preferably 80-90 cm, in this way, the cooling media sticking (following closely) to side plate 20 are motionless or move slightly forming a relatively turbulent self-grinding layer of media playing the role of protecting the side plate 20 of retaining ring. Inside the side plate 20 is disposed ribbed plate 21 for supporting the side plate 20; at two ends of side plate 20 are mounted cover plates 24 to prevent slag material from falling into retaining ring 12. In this way base plate 22, side plate 20, ribbed plate 21 and cover plate 24 form a semi-hermetic construction separating left and right barrel bodies. Both the surface of base plate and side plate in contact with process media have dismountable lining boards.

Referring to FIG. 5, the mounting position of side plate 20 is semi-ring in shape, high at the rear and low at the front because the rotating direction of barrel body 2 is from the front to the rear, thus more effectively using the retaining ring 12.

Referring to FIGS. 10 and 11, there is provided a barrel body for a metallurgical slag treatment equipment by barrel method according to the invention. Outer barrel body 2 is regularly cylindrically shaped. There are sending plates 17 uniformly distributed on the peripheral internal surface of outer barrel body 2. The sending plate 17 not only has an inclination angle α with respect to the radial direction of outer barrel body 2, but also has an inclination angle β with respect to the axial direction. Sending plates may be planer or spiral. Within outer barrel body 2 is mounted an inner barrel body 3. On outer barrel 2 is mounted a discharge chute 25. Slag material treated in inner barrel body 3 falls in side of the outer barrel body 2 by gravity and following the rotation of the outer barrel body 2, the slag material is subjected to an downward force component at angle β along sending plate 17 under the action of gravity, and slag material automatically slides along axial direction under the action of the force component; sliding from the vertical projection area of inner barrel body 3 onto the projection area of discharge chute 25 and out of the equipment.

Referring to FIGS. 14, 15 and 16, there are also provided convex sending hands 28 on the inner wall of inner barrel body 3. The sending hands scoop up steel balls 8 and slag material 7 in inner barrel body 3 and throw them down on the steel balls 8 and slag material 7 at the lower part of inner barrel body 3 after inner barrel body 3 has rotated a certain definite angle. Slag materials 7 are struck and crushed, and the steel balls 8 and slag materials near the surface of inner barrel body 3 are continuously scooped up by sending hands 28, improving the stirring and mixing of the steel balls 8 and slag material 7.

Referring to FIG. 14, there is shown an embodiment of sending hand 17. That is, on grid sections 31 of inner barrel body 3 are mounted sending hands 28, the cross-section of which is L-shaped. The L-shaped sending hands 28 can guide steel balls 8 to fall accurately into the region where steel balls 8 should fall into, generally the slag falling point of slag material 7. The steel balls 8 fallen down strike and crush slag material and intensity cooling effect. At the same time, sending hands 28 also scoop up the steel balls 8 and slag material 7 near grid sections 31 of inner barrel body, improving the stirring and mixing of steel balls 8 and slag material 7 and facilitating the heat exchange of steel balls 8 and slag material 7. Sending hands may be castings or weldments and are convenient for change.

Referring to FIGS. 15 and 16, on end cover 26 of inner barrel body are mounted some sending hands 28, At the end of sending hand 28 facing the center of end cover 26 is mounted a guide plate 27. Sending hands are uniformly radially arranged from the center of end cover 26. Working face of sending hands 28 is flat. On the back surface of which there is a reinforcing ribbed plate. Guide plate 17 is V-shaped, the magnitude of sloping of the V-shape is appropriate for steel balls 8 to be thrown just to the slag falling point of slag material 7. Sending hands 28 and guide planes 27 may be castings or weldments and are convenient for change.

The invention claimed is:

1. A steel slag treatment equipment, comprising:
   left and right barrel bodies, a flow branching pan, a mandrel, and a mandrel feed funnel,
   wherein the flow branching pan is placed between the left and right barrel bodies, opposite which is the opening end of barrel body, the mandrel feed funnel is mounted over the flow branching pan, a retaining ring is mounted below the flow branching pan, the mandrel is fixedly connected to the left and right barrel bodies,
   wherein the left and right barrel bodies are divided into outer and inner portions, an inner barrel body is mounted within an outer barrel body,
   wherein a plurality of spiral sending plates are mounted on an inner surface of the outer barrel body to secure normal discharge, which are uniformly distributed along the inner surface of the outer barrel body and partly mounted between the inner and outer barrel bodies,
   wherein the inner barrel body is composed of at least one grid section, one end of the grid section is fixed on an end cover of the outer barrel body via an insertion opening made of supporting rings, another end of the grid section is joined with the supporting ring fixedly connected on the outer barrel body,
   wherein the mandrel is fixedly connected with the outer barrel body, the outer barrel body is cylindrically shaped, and
   wherein each sending plate not only has an inclination angle with respect to the radial direction of the outer barrel body, but also has an inclination angle with respect to the axial direction,
   wherein supporting bearings are mounted at two ends of the mandrel outside the left and right barrel bodies, a geared ring for transmitting a force moment is mounted at one side outside the outer barrel body, the geared ring is fixedly connected with one end of the outer barrel ring,
   wherein convex sending hands are mounted on the inner wall of the inner barrel body, wherein the retaining ring has radially disposed supporting ribbed Plates between two side plates of the left and right barrel bodies, a fixed hood is disposed at an outer periphery of the retaining ring, the retaining ring and the fixed hood are fixed on a foundation, wherein, the retaining ring has a base plate and side plates, the retaining ring further comprises a cover plate and a ribbed plate, the base plate is a circular slat for the most part, the side plates are annular plates, the side plates and the base plate are in a ⊢ shaped, the side plates are at an inward distance from a side surface of the base plate, and wherein a surface of each of the base plate and the side plates in contact with process media are provided with a dismountable backing (lining) board.

2. The steel slag treatment equipment recited in claim 1, wherein, the angle with respect to the axis of outer barrel body is between 30°-55°.

3. The steel slag treatment equipment recited in claim 1, wherein the inward distance is equal to the width of the base plate, the ribbed plates are mounted inside the side plates.

4. The steel slag treatment equipment recited in claim 3, wherein, the width of the base plate is 50-150cm.

5. The steel slag treatment equipment recited in claim 3, wherein, the mounting position of the side plate is semicircular ring in shape high in rear and low in front.

6. The steel slag treatment equipment recited in claim 1, wherein, the sending hands are mounted on the grid section of the inner barrel body, the cross-section of the sending hands are L- or inverted Π-shaped, steel balls fall down from the L- or inverted Π-shaped sending hands.

7. The steel slag treatment equipment recited in claim 1, wherein, the sending hands are mounted on the end cover of the inner barrel body, a guide plate is mounted at one end of each sending hand, the sending hands are arranged radially with respect to a center of the end cover.

* * * * *